Dec. 27, 1966  K. G. BROWN  3,294,282
PACKAGE DISPENSING MEANS WITH DELIVERY ELEVATOR
Filed Sept. 9, 1963  4 Sheets-Sheet 1

INVENTOR.
KENNETH G. BROWN
BY James P. Malone

Dec. 27, 1966 K. G. BROWN 3,294,282
PACKAGE DISPENSING MEANS WITH DELIVERY ELEVATOR
Filed Sept. 9, 1963 4 Sheets-Sheet 2

INVENTOR.
KENNETH G. BROWN
BY
*James P. Malone*

Dec. 27, 1966         K. G. BROWN         3,294,282

PACKAGE DISPENSING MEANS WITH DELIVERY ELEVATOR

Filed Sept. 9, 1963         4 Sheets-Sheet 4

INVENTOR.

KENNETH G. BROWN

BY *James P. Malone*

United States Patent Office 3,294,282
Patented Dec. 27, 1966

3,294,282
PACKAGE DISPENSING MEANS WITH
DELIVERY ELEVATOR
Kenneth G. Brown, Wickham Ave., Mattituck,
Long Island, N.Y. 11952
Filed Sept. 9, 1963, Ser. No. 307,574
1 Claim. (Cl. 221—12)

This invention relates to package dispensing means and more particularly to a vending machine means for dispensing packages from a refrigerated enclosure.

This application is an improvement of my Patent No. 2,990,974, granted July 4, 1961 for Article Dispensing Means. That patent shows a dispensing means and a plurality of vertically spaced racks in which the articles are loaded. The articles are dispensed by pushing them to the front of the machine with tapes which are driven by separate motors on each rack. In my previous patent articles are merely pushed off the racks to a delivery chute.

The present invention is an improvement of my previous patent and one which is usable for fragile articles. For instance, in dispensing breakable articles such as eggs, milk bottles, and so forth; it is not desirable to have the articles or packages fall in a delivery chute as they are liable to get broken.

The present invention incorporates the delivery system using the horizontal, vertically spaced racks as in my previous patent but adds an elevator device for receiving the articles from different vertical levels and delivering them to a common delivery point where they can be lifted off by the user. Suitable electrical controls are provided.

Conventional dispensing techniques are generally not suitable for dispensing or handling articles under low temperature conditions since these conditions cause icing and greatly impede moving mechanical parts. The icing tends to make moving mechanical parts stick together, especially those using reciprocating motion. Also, necessary defrosting at regular intervals causes high humidity which results in corrosion and deterioration of moving parts. Therefore, complicated mechanical motions required for lifting fingers, sliding members, or spring loaded members, such as solenoids and clutches are generally not suited for low temperature and high humidity conditions. Sticking together of parts causes high torque starting and results in motor failure or breakage of connecting parts. These conditions are compounded when the machine is not continuously operating as, for instance, in vending machines where there are liable to be long periods between uses.

The present invention provides article dispensing means, for instance, for vending machines suitable for operating under low temperature and high humidity conditions. Moving parts have been reduced to a minimum and all reciprocating motion parts have been eliminated. Also, all spring loaded parts such as fingers or gates or solenoids and spring loaded clutches have also been eliminated.

The present invention comprises a plurality of guide rails which are mounted in parallel position on horizontal frames which are vertically spaced. The rails may be adjustably spaced to accommodate different size articles or boxes. The articles are moved by means of a plastic, metal or other equivalent tape which is anchored at one end and which extends along the rails and around the articles between the rails. The rail ends that come in contact with the tape are rounded by a stationary round pin member fastened in place. The contact points provide a differential friction which is useful. Therefore, the tape extends around several parallel rows of articles in succession, and the free end of the tap is connected to a motor driven spool. When the tape is motor driven, articles in the row nearest the motor end of the tape will be moved forward and the end article will be pushed onto an output conveyor. The article is conveyed rapidly to a delivery plate which disconnects the tape motor circuit so as to only deliver one package at a time.

In accordance with the present invention an elevator is provided which is adapted to rise to the selected level and receive the article, from the rack. A horizontal conveyor is mounted on the elevator which delivers the articles to one side of the elevator and onto the delivery platform on the elevator. When the article is placed on the delivery platform the elevator then lowers to the delivery opening and releases the delivery door so that the user may remove the article or package. A cutoff gate is provided to prevent the user from reaching into the machine beyond the delivery area.

Accordingly, a principal object of the invention is to provide new and improved dispensing means for articles.

Another object of the invention is to provide new and improved dispensing means for articles under refrigeration.

Another object of the invention is to provide new and improved article dispensing means having a minimum of moving mechanical parts.

Another object of the invention is to provide new and improved means for vending articles under refrigeration which may be fragile such as eggs and bottles, for instance, milk bottles or bottles for soft drinks.

Another object of the invention is to provide a dispensing machine of the type having horizontal, vertically spaced racks adapted to hold rows of articles, means to deliver said articles from said racks to a common delivery opening in said machine comprising, an elevator mounted for vertical movement in front of said racks, a horizontal conveyor mounted on said elevator, and electrical control means for controlling the rack delivery means, the elevator and the horizontal conveyor.

These and other objects of the invention will be apparent from the following specification and drawings of which:

Figure 1:
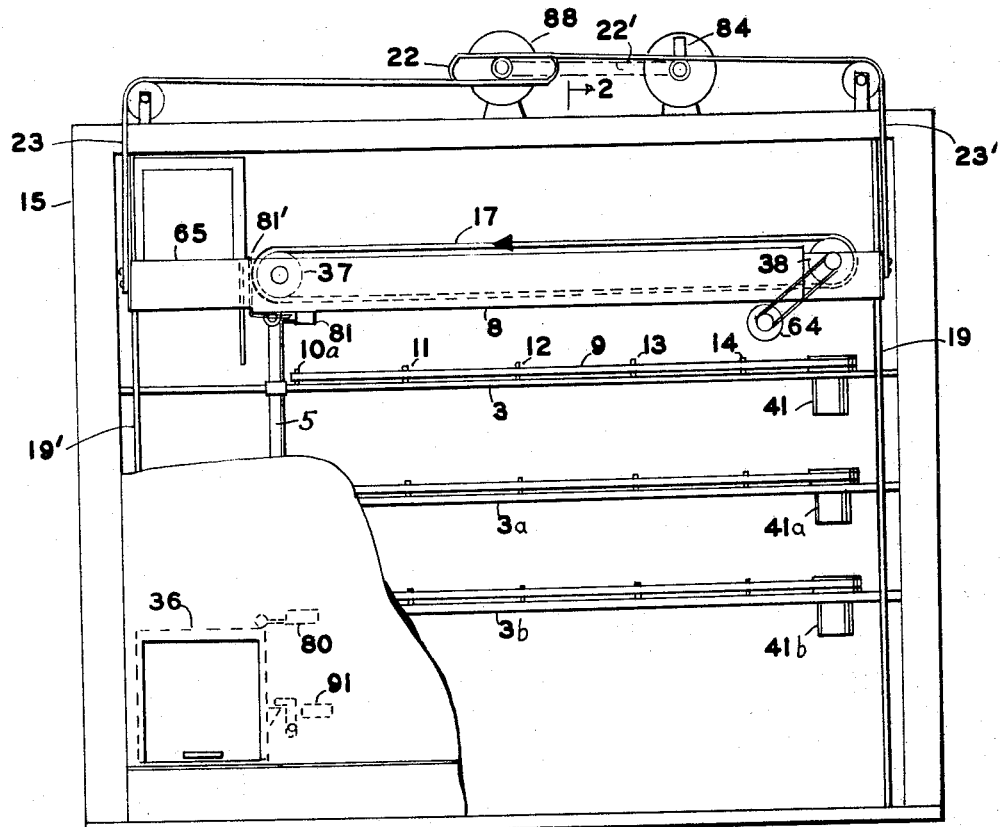
FIGURE 1 is a front view of an embodiment of the invention, with the front partially removed.
Figure 2:
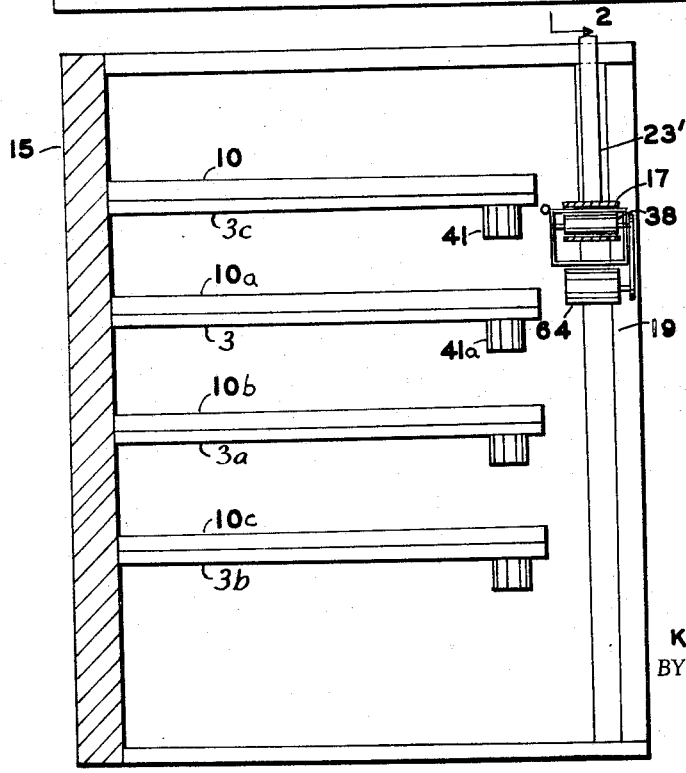
FIGURE 2 is a side sectional view along line 2—2 of FIGURE 1.

The invention generally comprises an enclosure 15 which may be a refrigerator box. A plurality of racks 3, 3a, 3b, etc. are vertically spaced inside the box 15. Each rack has a plurality of channels provided by rails 10, 11, 12, 13, and 14. The spaces between the rails are to receive articles to be dispensed. The articles are pushed forward in the channels by means of a driven tape 9 as specifically shown in FIGURE 3. The tape extends into the channels and is driven by the motors 41, 41a and so forth to push an article forward out of the channels and onto the elevator 8. The elevator has conveyor 17 which is adapted to be driven by the motor 64, FIGURES 1 and 2. The elevator is mounted in vertical channels 19 and 19' so that the elevator may move vertically. The elevator is lifted vertically by means of the motor 88 which drives a paddle 22 which rolls up two tapes 23 and 23' which may be of Mylar which are connected to the elevator.

The paddle 22 provides a variable speed motion to the elevator and is so dimensioned as to easily index the elevator at the tier levels. The paddle 22 is connected by chain 22' to rotary tier switches 84, 84' which control the paddle and elevator operation.

The general operation of the device, as will be more fully explained, is that the elevator is moved to a selected tier. An article is pushed forward onto the elevator. The article is then conveyed by the conveyor 17 to the left and onto the delivery platform 65 which is mounted on the elevator. The elevator then falls by gravity to the delivery position as shown at delivery door 36 in FIGURE 1, so that the delivery platform 65 is behind the delivery door area.

The conveyor 17 may be a plastic belt for instance of Mylar or a woven metal belt mounted on the rollers 37 and 38 which are mounted and adjustable on the elevator. The conveyor roller 38 is driven by the motor 64 by means of the belt or chain.

Delivery door 36 is vertically slidable and is lifted by the consumer to remove the article when the elevator is in delivery position but locked during the vending cycle.

Each rack may carry a different category of articles so that a number of different articles may be distributed from the machine per tier. Multiple motors may be installed per tier.

Figure 3:
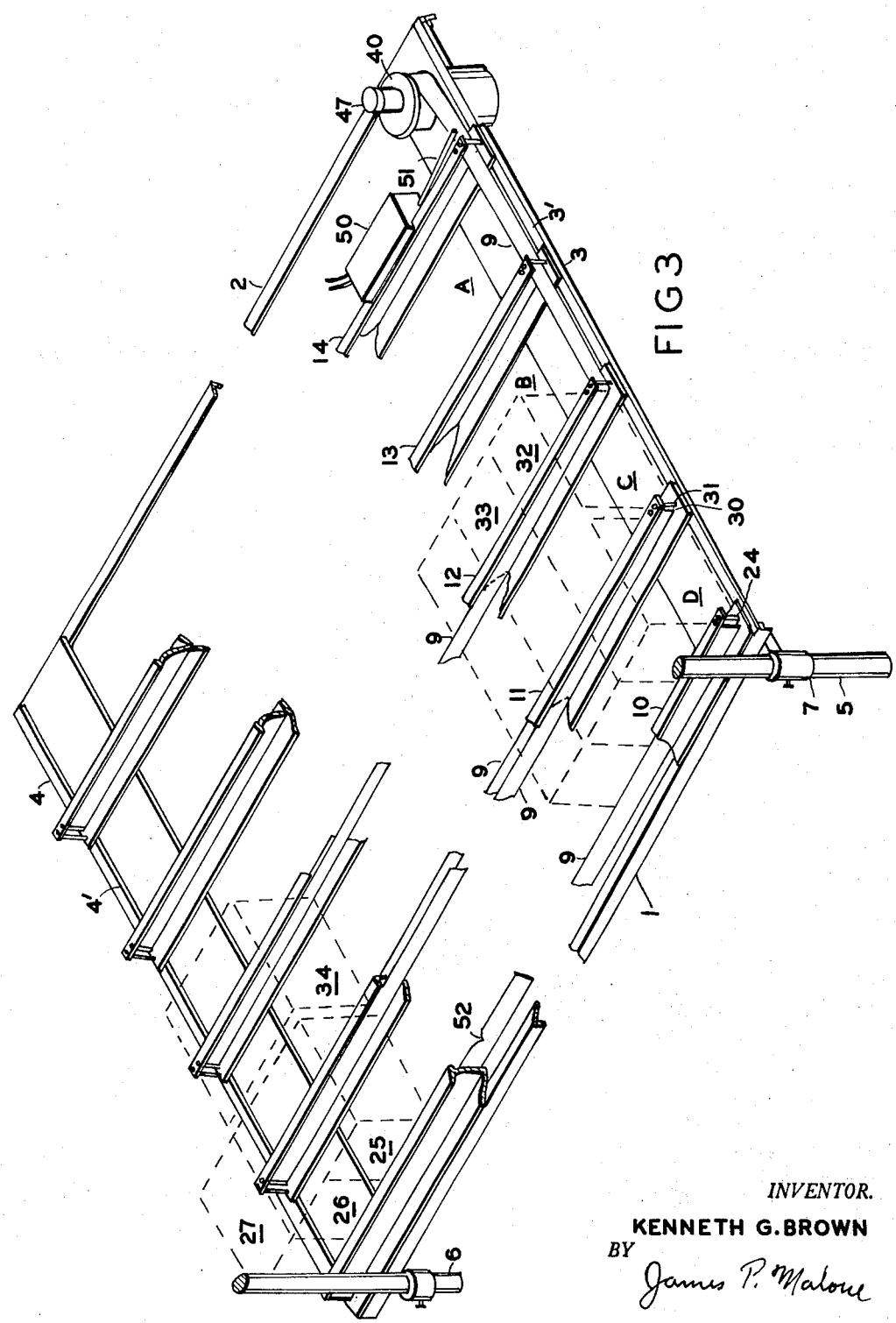
FIGURE 3 is a detail view of one of the horizontal racks with tape drive.

Referring to FIGURE 3, the racks, as also shown in my previously mentioned patent, comprise a rectangular frame having side members 1 and 2 and front and back members 3 and 4. The frame is mounted on vertical standards or pipes 5 and 6 or to the walls of the box so that a number of frames may be mounted one above the other. The frames may be connected to the standards with adjustable brackets 7 so that the vertical spacing may be adjusted to accommodate different size articles.

A plurality of parallel rails 10, 11, 12, 13, and 14, are mounted on the front and back members 3 and 4. The front and back members have slots 3' and 4' so that the rails may be fastened to the front and back members with adjustable spacing to accommodate different size articles.

The rails may be of extruded aluminum and have a general inverted T-shape, the horizontal portion being on the bottom.

The tape 9 is anchored at one end to the frame, for instance around the guide pin 24 at the end of the rail 10, FIGURE 3. The tape then extends along the inside of the rail 10 around the boxes 25, 26, 27, then forwardly between these boxes and the rail 11, then through the space 30 between the end of rail 11 and pin 31, then around the boxes 32, 33, 34, and so forth, then forwardly down between the other side of these boxes and the rail 12. Since there are no articles shown in the channels A and B between the rails 12, 13, and 13 and 14, the tape then extends directly across the front of these channels onto the spool 40 which is connected to be motor driven by the motor 41. If there were articles in the channels A and B the tape would extend around those articles in the same manner as described in connection with the channels C and D.

All of the channels are open at the forward end so that an article falling out the forward end of any channel will be ejected onto the elevator conveyor.

A clutch 47 connects the motor shaft and the spool 40. This clutch may be a key pin device which connects keyed portions of the motor shaft and the spool. The clutch is not disengaged during the operation. It is only used to disconnect the spool when loading the machine.

The showing of FIGURE 3 only shows one rack. There may be any number of racks stacked with suitable vertical spacing on the standards 5 and 6. The racks are made with the maximum spacing between all parts for providing the maximum ventilation of the articles for proper refrigeration.

The operation of the rack is as follows:

The rack is shown with the channels C and D loaded with the articles and the channels A and B empty. The tape 9 is anchored in the end of the rail 10 and extends around the articles in channel D and around the articles in channel C, the other end of the tape being connected to the motor driven spool 40. When the motor is actuated, the spool 40 will wind counter-clockwise and the tape will eject the first article in the channel C.

The articles in the channel D will not move until channel C is emptied. This is because the tape is effectively anchored at the end of the rail 11 due to differential friction.

The tape is preferably of Mylar or other equivalent material having good wearing qualities.

An "empty" switch 50 is provided. This switch may be a micro switch having an extending arm 51 which rides on top of the tape. The tape is notched as shown at point 52, the position of the notch being chosen so that when all the articles are delivered, the notch 52 will actuate the switch arm 51 and light "empty" indicator light 99.

Figure 5:
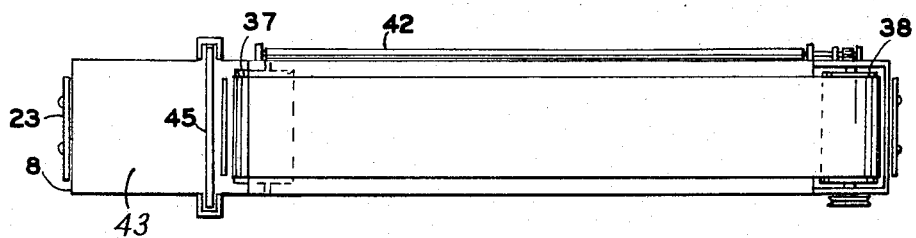
FIGURES 5 and 6 are top and front views of the elevator mechanism.
Figure 6:
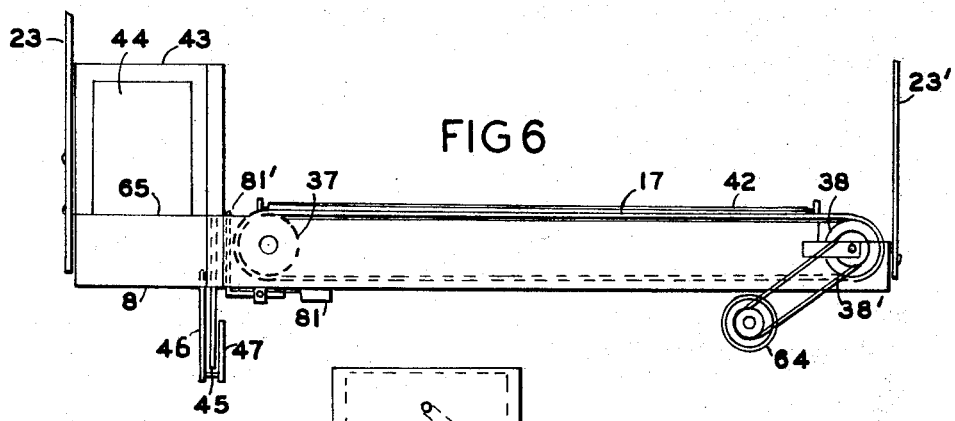
Figure 7:
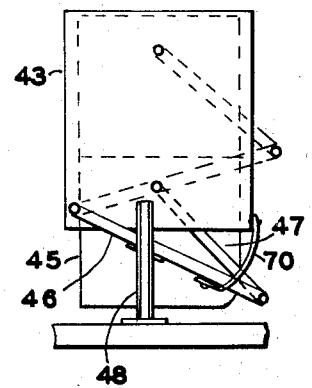
FIGURE 7 is a detail view of the elevator mechanism.

Referring to FIGURES 5, 6, and 7, the elevator 8 comprises a hollow frame member of rectangular cross-section, which extends substantially across the front of the case and in front of the tiers. The elevator is adapted to be lifted by the means of the tapes 23 and 23' as previously described and the elevator descends by means of gravity. A horizontal conveyor 17 is mounted on the elevator comprising rollers 37 and 38 upon which is mounted the belt which may be a plastic belt which may be of Mylar or woven metal. The horizontal conveyor is adapted to be actuated by the motor 64 on the elevator which is connected to the roller 38 by means of a pulley and belt 38' mounted on the roller shaft.

An important feature of the invention is a long thin roller 42 which extends along the upper rear side of the elevator and extends slightly above the level of the belt on the elevator. This roller 42 is rotatably mounted on the elevator frame end is geared to the roller 38. Therefore, when the horizontal belt conveyor is running, then the roller is also rotating in the direction to assist the articles, or packages from the tiers onto the belt 17.

At the left hand side of the elevator is a delivery compartment comprising an enclosure 43 having a platform 65 and having an aperture 44 through which the articles may be lifted. As the articles are conveyer into the delivery enclosure they trip the delivery switch 81 by means of the plate 81' which is pivotally mounted on the elevator frame and extends slightly above the upper surface of the elevator so that it will be struck by packages being conveyed by the roller 37.

On the inner side of enclosure 43 and facing belt 17 of the elevator there is a sliding lock-out door 45 also shown in FIGURE 7. The purpose of the door is to prevent people from reaching into the tiers. The door 45 is slidably mounted up and down in suitable guides in the elevator frame. The door 45 is mounted to the elevator frame by means of the linkage comprising the member 46 which is pivotally mounted on the elevator frame and which is connected at its other end to the member 47 which is pivotally connected to the upper side of the sliding door 45. There is a mechanical multiplication of the motion of members 46 and 47 and the door 45. The door is normally opened by gravity and tape 70 retains door 45 in lowered position. However, when the elevator descends to the bottom of the case the member 46 engages a pin 48 which is in the bottom of the case 15 which pin forces up the members 46 and 47 and closes the lock-out door 45 when the elevator is at the bottom delivery position.

Figure 4:
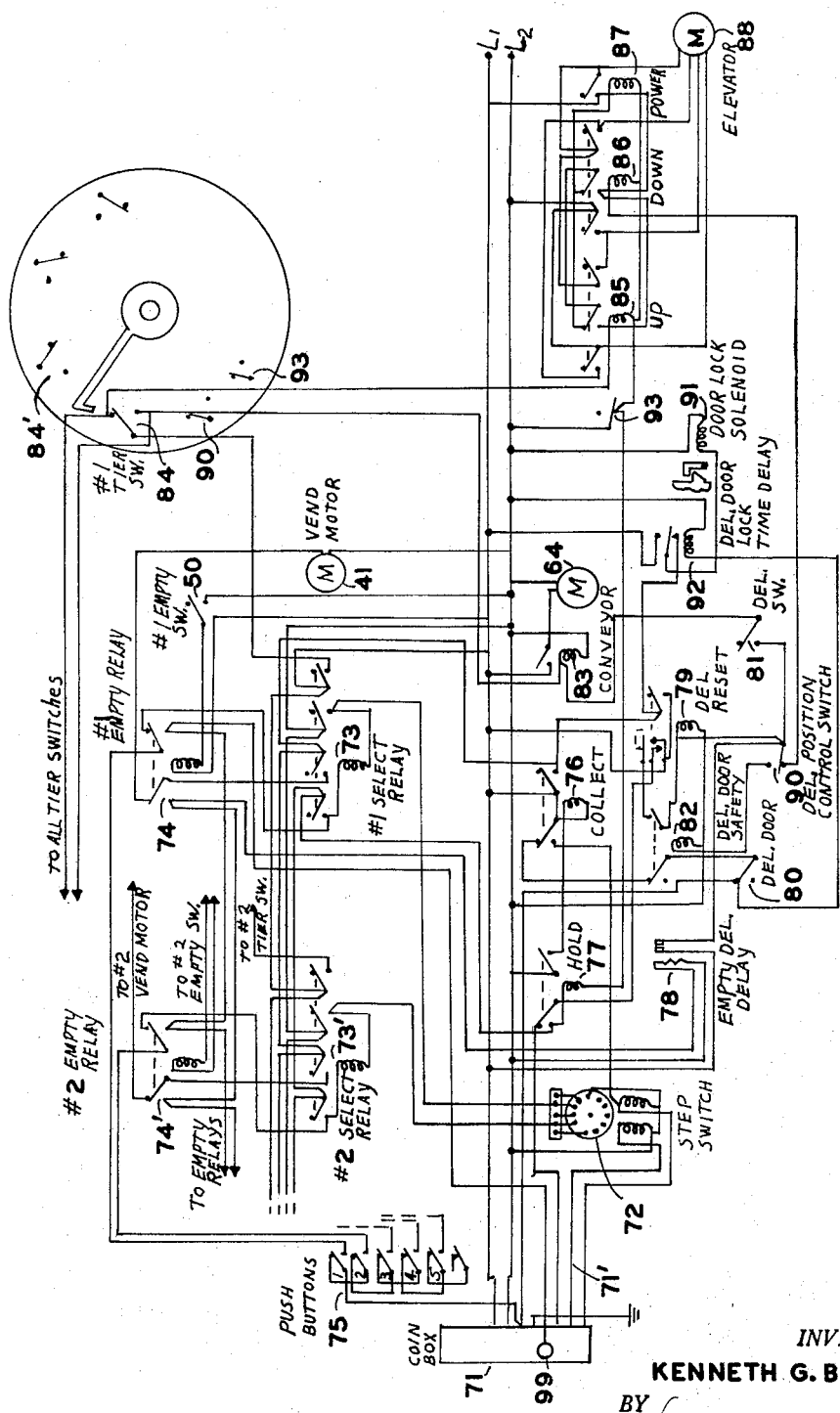
FIGURE 4 is a circuit diagram of the electrical control means.

The apparatus is adapted to be started by means of a coin operated control 71. FIGURE 4, which may be a conventional device for use in vending machines such as manufactured by National Rejectors, Inc., St. Louis, Mo. or as shown in Patents 2,058,637; 2,371,316; and 2,564,552. A number of different articles may be accommodated, each category having its own spool and tape. For instance, four separate items may be mounted in the four channels, A, B, C, and D, each having its own motor and tape as shown in my previous patent. The coin-operated control mechanism 71 may be conventional and its specific details are outside the scope of the present invention. However, it should preferably be of the type having a coin collecting relay and have means to return coins.

Referring to FIGURE 4, operation of the vendor begins at the "coin mechanism" 71 where an electrical pulse is generated for each five cents worth of coins deposited; that is, one pulse for a nickel, two for a dime and five for a quarter.

These pulses are fed on lead 71' into a "stepping switch" 72 referred to as a "totalizer" and advance the "stepping switch" or "Totalizer" 72 a number of contacts corresponding to the number of five cent units in the price; that is, for forty cents the stepper is stepped to the eighth price contact.

This contact completes the circuit on the neutral or negative side of all of the "select relay" 73 coils of those items intended to be sold at forty cents. There is one "select" and one "empty" relay for each category of items in the machine.

Selecting the item desired, in this price group, is accomplished by depressing the "pushbutton" 75 for that item; this supplies power from the pushbutton through a set of normally closed contacts on the "empty-relay" 74 to the operating coil of the "select relay" 73 of the selected item.

When an item is sold out, the "empty switch" 50, see also FIGURE 3, for the item closes and energizes the "empty relay" 74 for that item, and opens a set of N.C. contacts in the pushbutton circuit to the "select relay" 73 and closes the circuit to the empty light 99 in the coin box. The second set of contacts open the vend motor circuit and close the heater circuit of the "empty-delivery thermodelay relay" 78.

To prevent the immediate ending of the vending cycle when the last item is delivered to the conveyor and the empty switch is actuated, the "empty-delivery thermodelay relay," 78 will not close the circuit to operate the "delivery reset" 79 for the period of the time delay which is from 90 to 120 seconds, this will allow normal operation of the "delivery switch" 81 by the vended items, and a normal delivery. If no merchandise has been put in this section of the vendor and the "empty switch" 50 has not been operated, then, during the vending cycle the empty switch operating device, mounted on the tape, will operate the "empty switch" 50 and in turn the "empty relay" 74 and since there is no merchandise to operate the "delivery switch" 81 the vendor will just continue to operate until the heater in the "empty delivery thermo-delay relay" 78 heats up and causes the contacts to close which will complete a circuit the same as if the "delivery switch" 81 has been operated. The vendor will complete the vending cycle and keep the machine in service for the vending of the balance of the items in the vendor.

Power for the "pushbuttons" 75 is supplied through a set of N.C. contacts on the "collect-reset" relay, then through a set of N.C. contacts on the "delivery door safety relay" 82 and also through the N.C. contacts of the "delivery door switch" 80.

The closing of the "select relay" 73 makes a holding circuit for the neutral or negative side of its operating coil and also connects the pulse from the pushbutton to the operating coil of the "hold relay" 77.

The closing of the "hold relay" 77 connects the power side of the line to the operating coil of the "hold relay" 77 and then back to the operating coil of the "Select Relay" 73 through two sets of contacts, one on each relay. The holding current is supplied through the "delivery-reset" relay 79.

Closing the "hold relay" 77 also closes a set of contacts to the operating coil of the "collect-reset relay" 76.

Operation of the "collect-reset relay" 76 opens a set of contacts and removes the current supply to the pushbuttons and preferably closes the current supply to the collect solenoid not shown in the "coin box" 71 to collect the money and also reset the "stepper" 72 or "totalizer" 72 to zero.

The second set of contacts on the "collect-reset relay" 76 close and supply power through a set of contacts on the "select relay" 73 and a set of contacts on the "empty relay" 74 to the "vend motor" 41.

Power for the elevator and conveyor motor relays is supplied through a set of contacts on the "select relay" 73 to the "tier switch" 84 through N.C. contacts to the "up relay" 85 which operates the "elevator motor" 88. The elevator, on reaching the tier, operates the "tier switch" 84 shutting off the power to the "up relay" 85 and transferring it to the "conveyor relay" 83, to operate the "conveyor motor" 64, and to the "delivery switch" 81.

The "vend motor" 41 delivers the vended item onto the conveyor and the conveyor carries it to the delivery end where it operates the "delivery switch" 81.

The select relay 73 operates both the vend motor 41 which operates the tape, and the elevator motor 88. The speed of the vend motor must be chosen or adjusted slow enough so that the elevator can complete its full travel to any tier before an article is completely ejected on the elevator.

When the elevator stops the conveyor motor is turned on and the conveyor is sufficiently fast to deliver the article to the delivery door where the switch 81 shuts off the conveyor motor and the vend motor 41. The elevator is lowered by gravity when the motor is reversed. The motor cannot drive the elevator down since the elevator tapes 23 and 23' are not rigid and are only to lift the elevator, however the motor controls rate of descent.

Operation of the "delivery switch" 81 provides current to the operating coil of the "delivery-reset relay" 79.

Operation of the "delivery-reset relay" 79 opens the current supply to the "hold relay" 77, de-energizing the "hold" 77, "collect-reset" 76 and "select" 73 relays, allowing them to return to their normal positions.

Operation of the vendor for another sale before one is completed is prevented by the "delivery-reset" relay 79, which opens the circuit to the coin box coin reject solenoid, not shown, which directs any coins deposited into the coin return cup.

The holding current for the "delivery-reset relay" 79 is provided through a set of its own contacts in series with a set of contacts on the "delivery door safety relay" 82.

Operation of the "delivery-reset relay" 79 provides current through a set of N.C. contacts of the "delivery-position control switch" 90 to the operating coil of the "down relay" 86 which returns the eleavtor to the delivery position, where it operates the "delivery positioning switch" 90 which opens the circuit of the "down relay" 86 and closes a circuit to operate the "delivery door safety relay" 82.

Operating the "delivery door safety relay" 82 opens the holding circuit of the "delivery reset relay" 79.

When the "delivery reset relay" 79 returns to its normal position it makes up a circuit to supply current to the coin box and opens a circuit to the "door-lock solenoid" 91 unlocking the delivery door so that vended item may be removed.

Operation of either the "up relay" 85 or the "down relay" 86 closes the circuit to the operating coil of the "power relay" 87 supplying power to the "elevator motor" 88.

Opening the delivery door operates the "delivery door switch" 80 which opens the circuit to the pushbuttons and the "delivery door-lock time delay relay" 92.

To summarize, (1) Article on the conveyor closes the switch 81.
(2) Switch 81 energizes relay 79 which has a holding circuit.
(3) When the elevator comes down to the delivery position, it closes the switch 90.
(4) Switch 90 energizes the solenoid 82 which opens the holding circuit of solenoid 79.
(5) Solenoid 79 opens the circuit through the door lock solenoid 91 thereby releasing the door so that the user can lift it.

After the vended item is removed and the delivery door closes, current is supplied through the "delivery door switch" 80 to the "delivery door-lock time delay relay" 92 which, after the time delay (90 to 120 sec.) will operate and energize the "door lock solenoid" 91 and lock the delivery door. This is to prevent the door from being opened after the machine has been unused for about two minutes.

The "safety limit switch" 93 is located on the tier wheel switch 84. When operated, it opens the neutral side of both the "hold relay" 77 and the elevator "power relay" 87. This switch is operated only if the elevator exceeds its normal travel. Resetting is done by manually closing relays 77 and/or 87.

The switch is operated if the elevator exceeds its normal travel, either up or down. Therefore, the resetting must be done by manually closing the appropriate relay, the up relay if the elevator is down too far or the down relay if the elevator is up too far. Then close the power relay while still holding the selected direction relay closed. When elevator reaches the delivery position releasing the power relay will stop the elevator.

I claim:

In a dispensing machine for fragile articles or packages of the type having horizontal vertically spaced racks adapted to hold rows of packages and having means to push said packages out of said racks;
  means to deliver said packages pushed from said vertically spaced racks to a common delivery opening in said machine so that said package is supported underneath at all times comprising,
  an elevator mounted for vertical movement adjacent to said racks to receive said packages pushed therefrom,
  elevator motor means connected to said elevator to move said elevator vertically,
  means to control said elevator motor means,
  a horizontal conveyor mounted on said elevator to move said received packages into alignment with said delivery opening,
  conveyor motor means connected to drive said conveyor,
  control means connected to said conveyor motor means,
  a delivery door for said delivery opening in said machine,
  an article operated delivery switch on said elevator,
  an control relay means responsive to said delivery switch and movement of said elevator to delivery position, to unlatch said delivery door whereby said fragile articles are delivered with full support and control at all times to said delivery opening.

References Cited by the Examiner

UNITED STATES PATENTS

| | | | |
|---|---|---|---|
| 2,354,896 | 8/1944 | Weiler | 221—129 X |
| 2,531,238 | 11/1950 | Tandler et al. | 221—13 X |
| 2,990,974 | 7/1961 | Brown | 221—103 |

FOREIGN PATENTS

| | | |
|---|---|---|
| 167,501 | 4/1956 | Australia. |

ROBERT B. REEVES, *Primary Examiner.*

KENNETH N. LEIMER, *Examiner.*